(12) United States Patent
Claudepierre (10) Patent No.: US 9,559,546 B2
(45) Date of Patent: Jan. 31, 2017

(54) STAND INDUCTIVE CHARGER

(71) Applicant: Google Inc., Mountain View, CA (US)

(72) Inventor: Vincent Claudepierre, San Francisco, CA (US)

(73) Assignee: Google Inc., Mountain View, CA (US)

( * ) Notice: Subject to any disclaimer, the term of this patent is extended or adjusted under 35 U.S.C. 154(b) by 396 days.

(21) Appl. No.: 14/043,024

(22) Filed: Oct. 1, 2013

(65) Prior Publication Data
US 2015/0091500 A1    Apr. 2, 2015

(51) Int. Cl.
*H02J 7/00* (2006.01)
*H02J 7/02* (2016.01)
*H02J 5/00* (2016.01)

(52) U.S. Cl.
CPC .............. *H02J 7/025* (2013.01); *H02J 5/005* (2013.01); *H02J 7/0044* (2013.01)

(58) Field of Classification Search
CPC ......... H02J 7/025; H01F 38/14; Y02T 90/122; B60L 11/182; Y02E 60/12
USPC ....................................................... 320/108
See application file for complete search history.

(56) References Cited

U.S. PATENT DOCUMENTS

| | | | | | |
|---|---|---|---|---|---|
| 4,359,895 | A * | 11/1982 | Wolff | .................... | G01D 5/145 123/612 |
| 8,310,200 | B2 * | 11/2012 | Matouka | ................ | H02J 7/025 320/108 |
| 2005/0189910 | A1 * | 9/2005 | Hui | ..................... | H01F 17/0006 320/108 |
| 2006/0202665 | A1 * | 9/2006 | Hsu | ......................... | H02J 7/025 320/139 |
| 2007/0035917 | A1 * | 2/2007 | Hotelling | .............. | G06F 1/1632 361/679.56 |
| 2009/0218985 | A1 * | 9/2009 | Hallett | ..................... | G10H 1/32 320/108 |
| 2011/0074344 | A1 | 3/2011 | Park et al. | | |
| 2011/0156637 | A1 * | 6/2011 | Thorsell | ................ | B60N 3/002 320/108 |
| 2012/0178506 | A1 * | 7/2012 | Sorias | ................... | H02J 7/0042 455/573 |
| 2012/0268064 | A1 * | 10/2012 | Ostrom | .................... | G06F 1/26 320/108 |
| 2012/0299539 | A1 * | 11/2012 | Jones | ..................... | H02J 7/025 320/108 |
| 2013/0038278 | A1 | 2/2013 | Park et al. | | |
| 2013/0057203 | A1 | 3/2013 | Jones et al. | | |
| 2013/0198867 | A1 | 8/2013 | Ricci et al. | | |
| 2013/0307470 | A1 * | 11/2013 | Watanabe | ............... | H02J 7/025 320/108 |

* cited by examiner

*Primary Examiner* — Richard Isla Rodas
*Assistant Examiner* — Mohammed J Sharief
(74) *Attorney, Agent, or Firm* — Morris & Kamlay LLP (57) ABSTRACT

A charging device containing a support beam and a substantially planar housing may be configured to maintain an angle of under 90 degrees with respect to a flat surface that the charging device is placed on. The charging device may contain an inductive charging component that charges a mobile device in connection with the charging device. One or more magnets also contained in the charging device may enable the connection to a mobile device and may also facilitate the charging device rolling towards a mobile device.

17 Claims, 7 Drawing Sheets

STAND INDUCTIVE CHARGER

BACKGROUND

Traditional chargers for mobile devices such as mobile phones, tablets, laptops, and the like have connectors that require the mobile device to be placed on a flat surface or contained within a charger. For example, a mobile device may contain a female port that accepts the male port of a charging cable. Due to the connection to the charging cable, it may be difficult to position the mobile device in a usable manner without lifting the device off a resting position. Alternatively, traditional chargers that enable a mobile device to be docked upright only allow the mobile device to remain in one position. For example, a mobile device may be connected to a docking station such that the docking station maintains the mobile device in an upright position. However, a user may be required to lift the entire docking station or undock the mobile phone to use the mobile phone.

Further, larger mobile devices, such as tablets, do not generally connect to inductive chargers as a connection to the inductive charger is generally difficult to maintain for larger devices.

BRIEF SUMMARY

According to implementations of the disclosed subject matter, a device may contain a support beam and a substantially planar housing having a front and a back side. The front side may be configured to touch connect to a portable electronic device and the back side may be connected to the support beam. An inductive charging component may be disposed between the front and the back side and may charge the portable electronic device. The substantially planar housing may contain a circular edge. The device may be configured to roll towards the portable electronic device when the device is near the portable electronic device. Additionally, a magnet may be located proximate to the first side, such that the magnet is configured to align with a second magnet or metal component associated with the portable electronic device. The magnet may establish the touch connection with the portable electronic device. The location of the magnate may be adjustable such that the location of the magnet may adjust automatically when proximate to the portable electronic device. The inductive charging component may be an inductive coil and may charge the portable electronic device when the portable electronic device is connected to the device.

Devices configured according to the present disclosure enable inductive charging for portable electronic devices in a practical manner. Additional features, advantages, and implementations of the disclosed subject matter may be set forth or apparent from consideration of the following detailed description, drawings, and claims. Moreover, it is to be understood that both the foregoing summary and the following detailed description include examples and are intended to provide further explanation without limiting the scope of the claims.

BRIEF DESCRIPTION OF THE DRAWINGS

The accompanying drawings, which are included to provide a further understanding of the disclosed subject matter, are incorporated in and constitute a part of this specification. The drawings also illustrate implementations of the disclosed subject matter and together with the detailed description serve to explain the principles of implementations of the disclosed subject matter. No attempt is made to show structural details in more detail than may be necessary for a fundamental understanding of the disclosed subject matter and various ways in which it may be practiced.

DETAILED DESCRIPTION

A charging device configured to allow unencumbered use of an electronic portable device (i.e., a mobile device) while the device is charging may improve the quality of use of the device for a user. According to implementations disclosed herein, an inductive charging device may contain a substantially planar housing having a front side and a back side. The font side may be configured to touch connect to a mobile device such as a mobile phone, a tablet, a laptop computer, an e-book reader, a remote control, an electronic toy, a music player, or the like. The charging may be conducted through induction such that an inductive coil contained within the charging device may induce a charge into the mobile device when the mobile device is in connection with the charging device.

Figure 5:
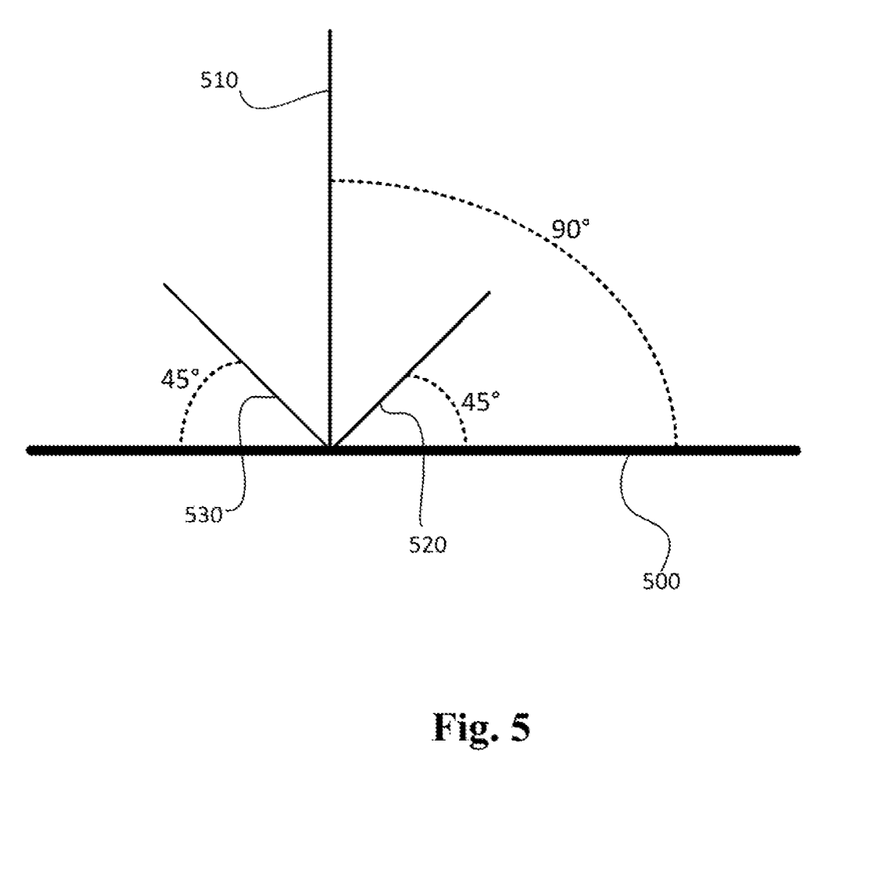
FIG. 5 shows an example visualization corresponding to angles respective to a flat surface according to an implementation of the disclosed subject matter

The back side of the charging device may be connected to a support beam. The support beam may enable the substantially planar housing to create an angle less than 90 degrees with a flat surface, when the charging device is placed on a flat surface. More specifically, a 90 degree angle may be the maximum angle a planar surface can create with respect to a flat surface on which the planar surface is placed upon. FIG. 5 shows a visual representation of angles with respect to a flat surface 500. As shown, the maximum angle, 90°, is created by structure 510 which is orthogonal to the flat surface. Structures 520 and 530 both create a 45° angle with respect to the flat surface. Notably, an angle less than 90° if a structure is not orthogonal to the flat surface, regardless of whether the structure is to the right or left of the orthogonal reference point. Accordingly, the support beam of a charging device, as disclosed herein, may enable the substantially planar housing of the charging device to maintain an angle less than 90°.

The charging device may contain one or more magnets to facilitate a touch connection with a mobile device. The magnet may attract and/or be attracted to a portion of the mobile device such as a mobile device magnet or a metal component of the mobile device. Further, the substantially planar housing of the charging device may contain a circular edge. The circular edge may enable the charging device to roll towards a mobile device based on the magnetic attraction.

Figure 1:
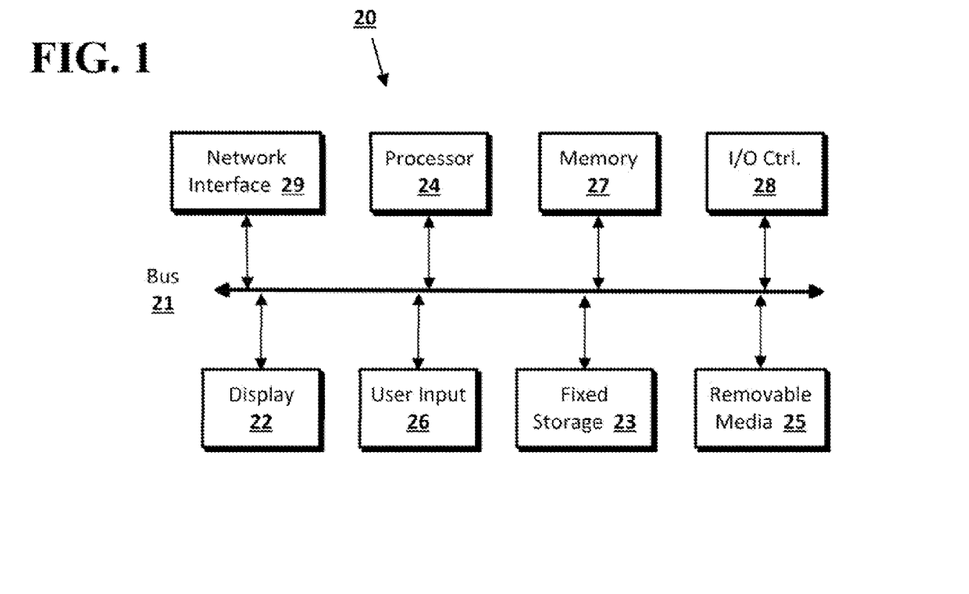
FIG. 1 shows a computer according to an implementation of the disclosed subject matter.

Implementations of the presently disclosed subject matter may be implemented in and used with a variety of component and network architectures. As an example, a charging device may be in connection with a mobile device that is connected to a wireless cellular network. FIG. 1 is an example computer 20 suitable for implementing implementations of the presently disclosed subject matter. The computer 20 includes a bus 21 which interconnects major components of the computer 20, such as a central processor 24, a memory 27 (typically RAM, but which may also include ROM, flash RAM, or the like), an input/output controller 28, a user display 22, such as a display screen via a display adapter, a user input interface 26, which may include one or more controllers and associated user input devices such as a keyboard, mouse, and the like, and may be closely coupled to the I/O controller 28, fixed storage 23, such as a hard drive, flash storage, Fibre Channel network, SAN device, SCSI device, and the like, and a removable media component 25 operative to control and receive an optical disk, flash drive, and the like.

The bus 21 allows data communication between the central processor 24 and the memory 27, which may include read-only memory (ROM) or flash memory (neither shown), and random access memory (RAM) (not shown), as previously noted. The RAM can include the main memory into which the operating system and application programs are loaded. The ROM or flash memory can contain, among other code, the Basic Input-Output system (BIOS) which controls basic hardware operation such as the interaction with peripheral components. Applications resident with the computer 20 can be stored on and accessed via a computer readable medium, such as a hard disk drive (e.g., fixed storage 23), an optical drive, floppy disk, or other storage medium 25. The example computer 20 may operate using a battery and the battery may be charged according to techniques discussed herein. More specifically, the computer 20 may touch connect with a charging device and a computer battery may be inductively charged via the charging device.

The fixed storage 23 may be integral with the computer 20 or may be separate and accessed through other interfaces. A network interface 29 may provide a direct connection to a remote server via a telephone link, to the Internet via an internet service provider (ISP), or a direct connection to a remote server via a direct network link to the Internet via a POP (point of presence) or other technique. The network interface 29 may provide such connection using wireless techniques, including digital cellular telephone connection, Cellular Digital Packet Data (CDPD) connection, digital satellite data connection or the like. For example, the network interface 29 may allow the computer to communicate with other computers via one or more local, wide-area, or other networks, as shown in FIG. 2.

Many other devices or components (not shown) may be connected in a similar manner (e.g., thermostat, document scanners, digital cameras and so on). Conversely, all of the components shown in FIG. 1 need not be present to practice the present disclosure. The components can be interconnected in different ways from that shown. The operation of a computer such as that shown in FIG. 1 is readily known in the art and is not discussed in detail in this application. Code to implement the present disclosure can be stored in computer-readable storage media such as one or more of the memory 27, fixed storage 23, removable media 25, or on a remote storage location.

Figure 2:
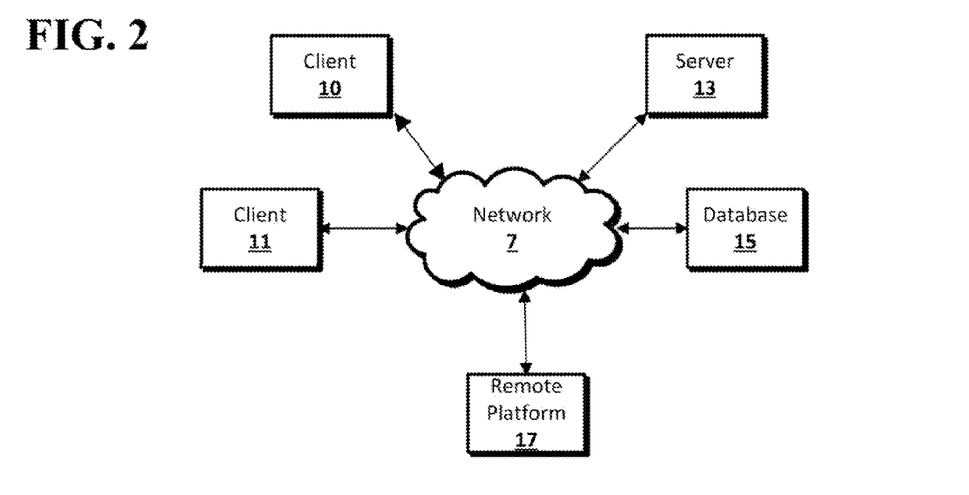
FIG. 2 shows a network configuration according to an implementation of the disclosed subject matter.

FIG. 2 shows an example network arrangement according to an implementation of the disclosed subject matter. One or more clients 10, 11, such as thermostats, local computers, smart phones, tablet computing devices, and the like may connect to other devices via one or more networks 7. The network may be a local network, wide-area network, the Internet, or any other suitable communication network or networks, and may be implemented on any suitable platform including wired and/or wireless networks. The clients may communicate with one or more servers 13 and/or databases 15. The devices may be directly accessible by the clients 10, 11, or one or more other devices may provide intermediary access such as where a server 13 provides access to resources stored in a database 15. The clients 10, 11 also may access remote platforms 17 or services provided by remote platforms 17 such as cloud computing arrangements and services. The remote platform 17 may include one or more servers 13 and/or databases 15.

More generally, various implementations of the presently disclosed subject matter may include or be implemented in the form of computer-implemented processes and apparatuses for practicing those processes. Implementations also may be implemented in the form of a computer program product having computer program code containing instructions implemented in non-transitory and/or tangible media, such as floppy diskettes, CD-ROMs, hard drives, USB (universal serial bus) drives, or any other machine readable storage medium, wherein, when the computer program code is loaded into and executed by a computer, the computer becomes an apparatus for practicing implementations of the disclosed subject matter. Implementations also may be implemented in the form of computer program code, for example, whether stored in a storage medium, loaded into and/or executed by a computer, or transmitted over some transmission medium, such as over electrical wiring or cabling, through fiber optics, or via electromagnetic radiation, wherein when the computer program code is loaded into and executed by a computer, the computer becomes an apparatus for practicing implementations of the disclosed subject matter. When implemented on a general-purpose microprocessor, the computer program code segments configure the microprocessor to create specific logic circuits. In some configurations, a set of computer-readable instructions stored on a computer-readable storage medium may be implemented by a general-purpose processor, which may transform the general-purpose processor or a device containing the general-purpose processor into a special-purpose device configured to implement or carry out the instructions. Implementations may be implemented using hardware that may include a processor, such as a general purpose microprocessor and/or an Application Specific Integrated Circuit (ASIC) that implements all or part of the techniques according to implementations of the disclosed subject matter in hardware and/or firmware. The processor may be coupled to memory, such as RAM, ROM, flash memory, a hard disk or any other device capable of storing electronic information. The memory may store instructions adapted to be executed by the processor to perform the techniques according to implementations of the disclosed subject matter.

Figure 3A:
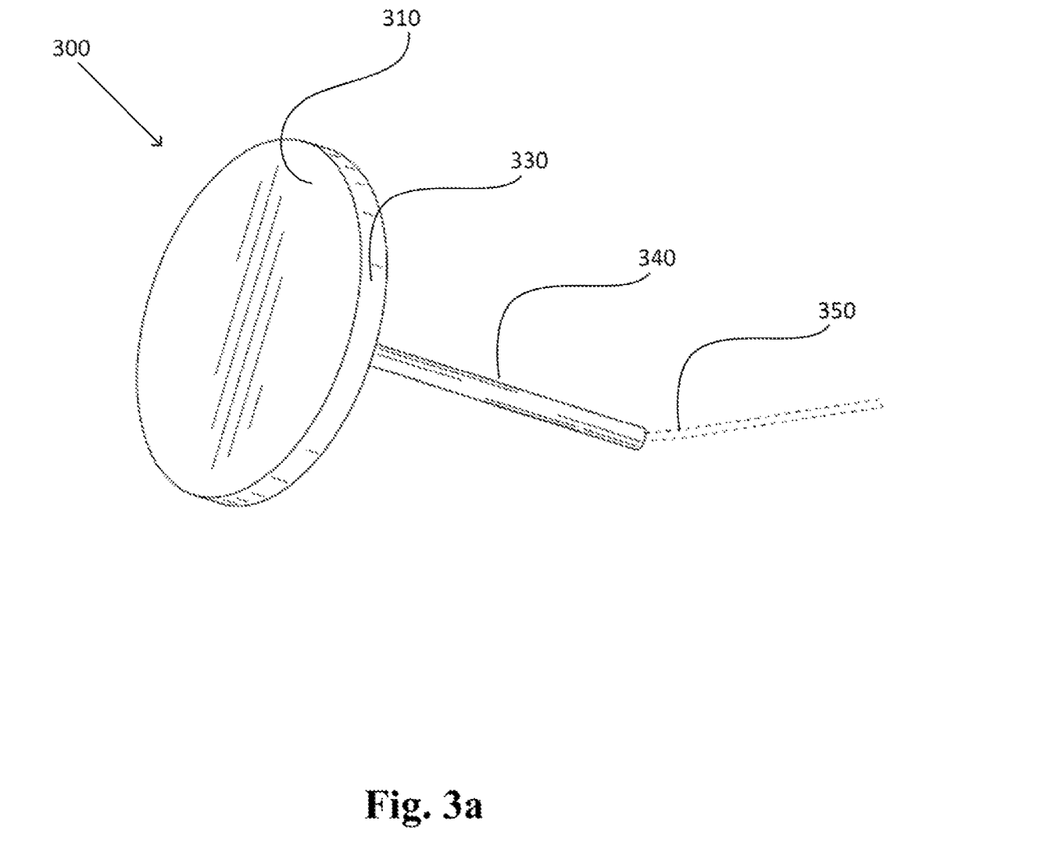
FIG. 3a shows an example visualization corresponding to a stand inductive charger according to an implementation of the disclosed subject matter.

According to implementations of the disclosed subject matter, as shown in FIG. 3a, a charging device 300 may contain a front side 310, a back side (not shown), an edge 330 between the front side 310 and the back side, a supporting beam 340 in connection with the back side and a cable 350 in connection with the supporting beam 340. The front side 310, back side, and edge 330 may create a substantially planar housing portion of the charging device. According to an implementation, the substantially planar housing portion of the charging device may be less than 9 mm such that the distance from the front side to the back side is less than 9 mm. Here, substantially planar may include a smooth planar housing, a planar housing with a textured surface, a slightly convex or convex housing, or the like. As an example, the front side portion of a charging device may be a smooth flat surface. As another example, the front side portion may be textured to increase the amount of friction between the front side and a mobile device that is in connection with the charging device. As another example, the front side portion may be concave, and may be configured to create suction between the charging device and a mobile device when a mobile device is connected to the charging device. As another example, the front side portion may be concave and may touch connect with a mobile device such that the concave front side portion fits into a convex mobile device portion. According to an implementation, the largest dimension for the charging device may be less than 18 cm. For example, as shown in FIG. 3*d*, the distance D from the front side of the charging device to the end of the supporting beam may be less than 18 cm.

According to an implementation of the disclosed subject matter, as shown in FIGS. 3*a*, 3*b*, 3*c*, and 3*d*, the substantially planar portion of the charging device may contain a circular edge 330. As shown in FIG. 3*a*, the charging device may rest on a flat surface such that the end of the supporting beam 340 and a portion of the circular edge 330 are in contact with the flat surface. According to an implementation, as shown in FIG. 4*a* the support beam of charging device 400 may be attached to the back side of the charging device such that when mobile device 450 is connected to the mobile device, the charging device supports the mobile device at an angle that is either the same as or different from the angle of the charging device while the device is not connected to a mobile device. As shown in FIG. 4*b*, the charging device 400 may be attached to the mobile device 450 such that the mobile device is rotated in comparison to the mobile device orientation in FIG. 4*a*. Notably, a charging device may touch connect to a mobile device while the mobile device is oriented in any applicable manner such as landscape, portrait, or the like. Further, when connected to a mobile device, the support beam of the charging device 400 and a portion of the mobile device 450 may rest on a flat surface, as shown in FIGS. 4*a* and 4*b*.

A charging device may be configured to facilitate a connection between the charging device and a mobile device such that a user may easily connect a mobile device to the charging device, without necessarily inserting a connector into the charging device. As disclosed herein, the charging device may contain one or more magnets that enable the charging device to touch connect to a mobile device. The charging device may roll towards a mobile device that is near the charging device based on the magnetic attraction between the one or more magnets contained in the charging device and a mobile device magnet and/or metal component, as disclosed herein. As an example, a user may hold a mobile phone containing a magnet close to the charging device such that the magnet within the mobile phone and the magnet within the charging device are attracted to each other. The attraction may cause the charging device to roll in the direction of the mobile phone and may facilitate an easier touch connection between the charging device and the mobile phone than if the charging device did not roll towards the mobile phone. Notably, the charging device's circular edge may allow the charging device to roll and the magnetic attraction between the charging device and a mobile device may be strong enough at a given distance that the charging device rolls on the circular edge towards the mobile device.

Figure 3B:
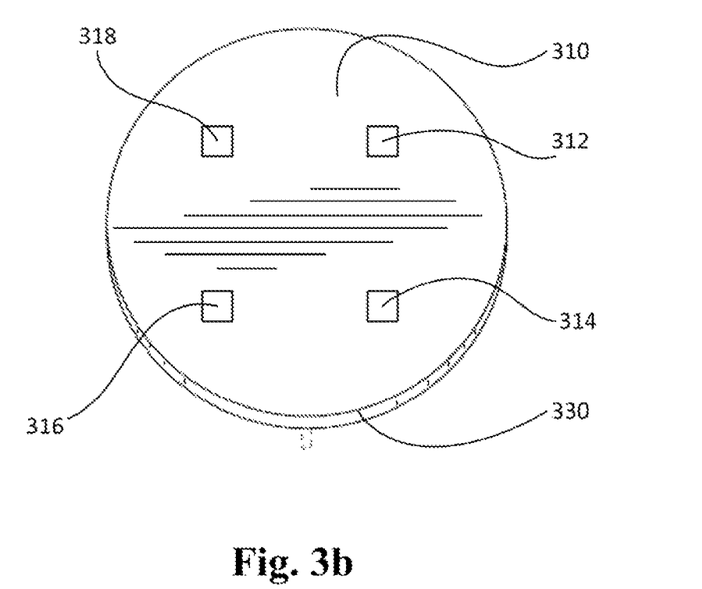
FIG. 3b shows an example visualization corresponding to the front side of a stand inductive charger according to an implementation of the disclosed subject matter.
Figure 3C:
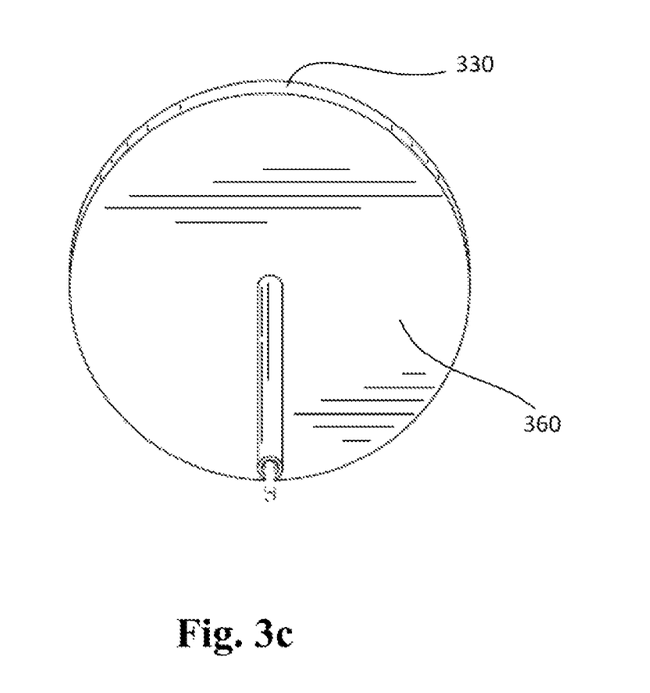
FIG. 3c shows an example visualization corresponding to corresponding to the back side of a stand inductive charger according to an implementation of the disclosed subject matter.
Figure 3D:
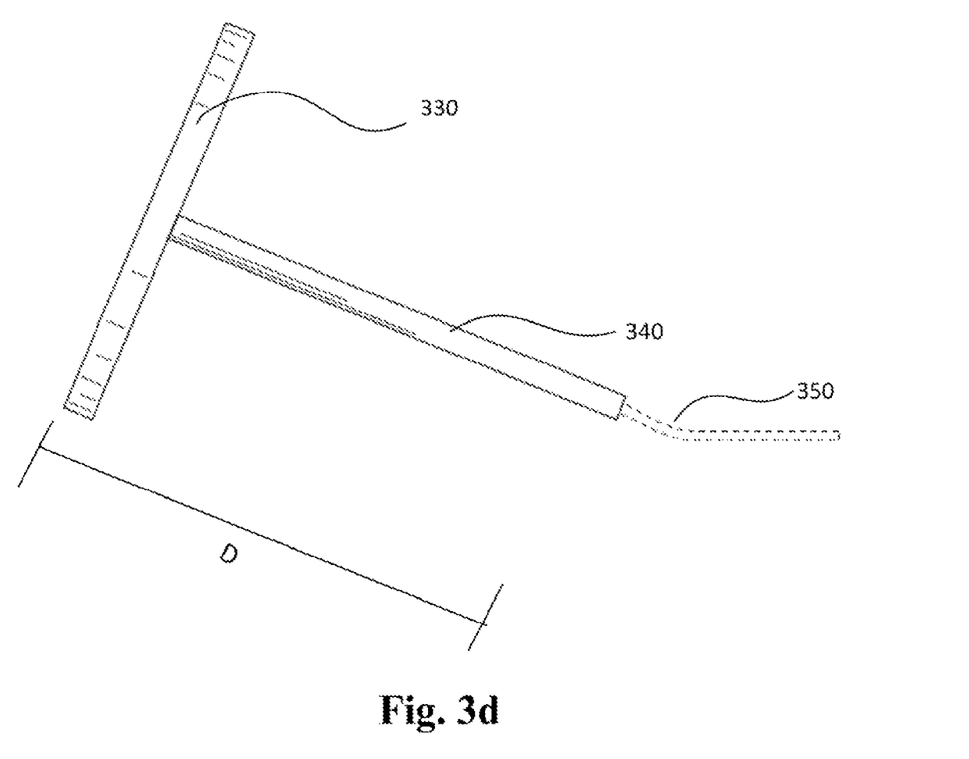
FIG. 3d shows an example visualization corresponding to the side of a stand inductive charger according to an implementation of the disclosed subject matter.
Figure 4A:
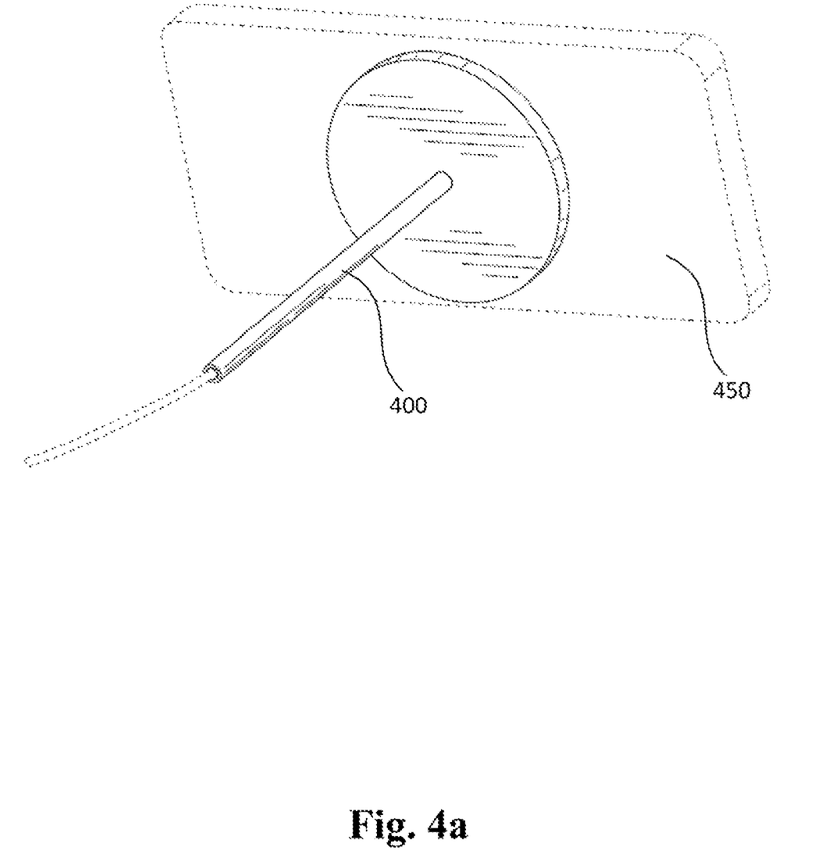
FIG. 4a shows an example visualization corresponding to a stand inductive charger in connection with a mobile device according to an implementation of the disclosed subject matter.
Figure 4B:
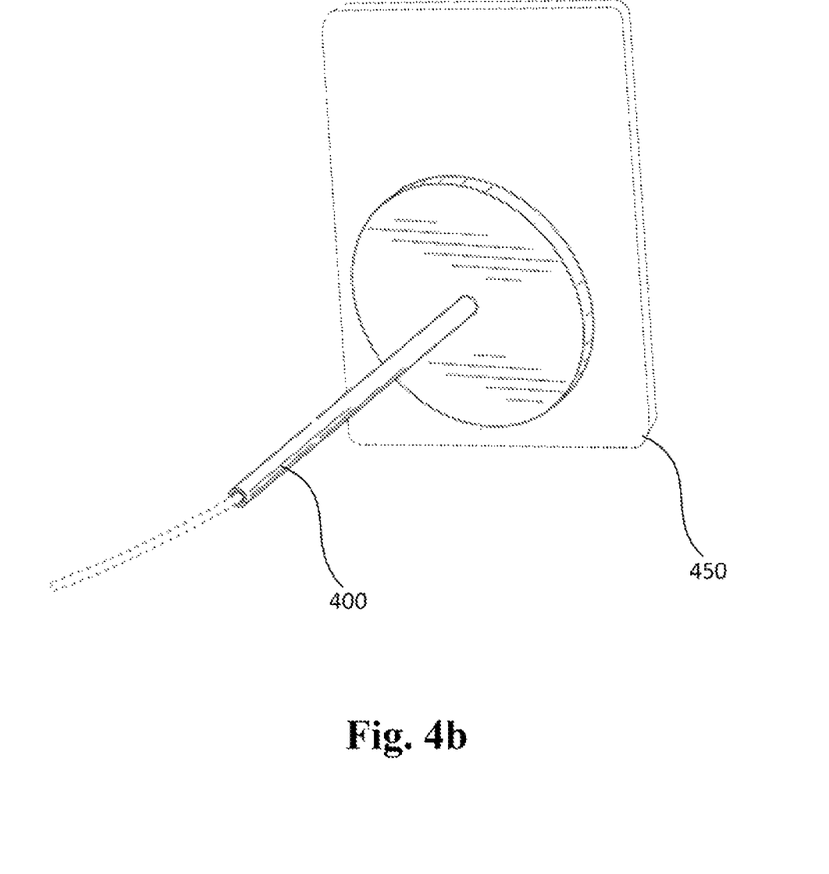
FIG. 4b shows another example visualization corresponding to a stand inductive charger in connection with a mobile device according to an implementation of the disclosed subject matter.

According to an implementation of the disclosed subject matter, a charging device may contain one or more magnets that are located proximate to the front side of the charging device, as shown in FIG. 3*b*. The one or more magnets may be attracted to a magnet or metal component in connection with a mobile device. The one or more magnets may be disposed beneath the front side housing, above the front side housing, or may form a portion of the front side housing. Further, the one or more magnets may be proximally closer to the front side (310 in FIG. 3*b*) of the charging device than the back side (360 in FIG. 3*c*) of the charging device. As a specific example, the one or more magnets may be located inside the substantially planar housing of the charging device, within 4 mm of the front side. The one or more magnets may be placed in any applicable position relative to the front side of the charging device such as the middle, towards the edges, or randomly placed. As an example, as shown in FIG. 3*b*, magnets 312, 314, 316, and 318 are located in four different locations on the front side 310. According to this example, the four magnets 312, 314, 316, and 318 may be located directly inside the housing beneath the front side 310 or may be integrated into the housing and part of the front side 310. The magnets may align with a magnet or metal component associated with a mobile device such that a touch connection is established.

The location of the one or more magnets may be adjustable within the charging device such that a magnet within the charging device may not be secured to a specific location. Accordingly, the magnet may shift to a location if it is magnetically attracted to another magnet or metal. As an example, a charging device may contain a magnet that is not secured to a single location. A mobile phone containing a magnet may be held close to the magnet and, based on the magnetic attraction, the magnet within the charging device may shift to a location within the housing of the charging device that is closer to the mobile phone. The charging device may roll towards the mobile phone based on the magnet shifting towards the mobile phone. Specifically, the shifting magnet may cause the charging device to roll based on the magnetic attraction and/or the shift in weight of the magnet within the charging device.

According to an implementation of the disclosed subject matter, the charging device may form a touch connection with a mobile device. A touch connection may be any applicable connection such that the mobile device touches and remains in contact with the charging device without being clasped to the charging device. As disclosed herein, the charging device may contain one or more magnets. A touch connection may be established based on the magnetic attraction caused by the one or more magnets and one or more magnets in connection with or located within a mobile device and/or a metal component in connection with or within the mobile device. The touch connection may be made stronger based on the material or texture used on the charging device and/or a mobile device. As an example, the front side of a charging device may be textured such that when a mobile device is in connection with the charging device, a greater amount of friction would be generated if the mobile device and/or the charging device were to slide with respect to each other. Accordingly, the charging device and mobile device may remain connected if either device was moved accidentally or if the mobile device was being used by a user while being charged by the charging device. As another example, the charging device and/or a component of the mobile device may be concave/convex and also may be malleable such that a suction effect is created when the charging device is attached to the mobile device. As a specific example, the charging device front side may be malleable and concave such that when the front side of the charging device is pressed against a mobile device, the air contained within the concave portion is released, fixing the charging device to the mobile device via the resulting suction effect. A touch connection as disclosed herein may be sufficiently strong to hold the mobile device in contact with the charging device, while still allowing the mobile device to be easily removed from the charging device. For example, a user may be able to remove the mobile device from the charging device using a single hand, such as by rotating one edge of the mobile device away from the charging device to separate the touch connection, while the charging device is held in place only by its own weight and/or the balancing force exerted by the supporting beam.

The charging device may be configured to charge the mobile device via induction. The charging device may contain an inductive coil that is powered via a power connection. For example, as shown in FIG. 3d, the charging device may be connected to a power cable 350 that provides the charging device with power. The power cable 350 may be connected to any applicable energy source such as a power outlet, a battery, a USB connection, a solar panel, or the like. A mobile device battery may charge via an electromagnetic field generated from inductively coupling the mobile device with the charging device. Induction coils within the charging device may be used to create an alternating electromagnetic field, resulting in charging the mobile device battery. More specifically, a charging device may contain an induction coil that creates an electromagnetic field such that when a mobile device is proximate to the charging device, the mobile device may convert the power generated by the electromagnetic field to an electrical current and the electrical current may be used to charge the mobile device battery. Notably, a mobile device battery may be charged via induction, without linking electronic connection points.

The foregoing description, for purpose of explanation, has been described with reference to specific implementations. However, the illustrative discussions above are not intended to be exhaustive or to limit implementations of the disclosed subject matter to the precise forms disclosed. Many modifications and variations are possible in view of the above teachings. The implementations were chosen and described in order to explain the principles of implementations of the disclosed subject matter and their practical applications, to thereby enable others skilled in the art to utilize those implementations as well as various implementations with various modifications as may be suited to the particular use contemplated.

The invention claimed is:

1. A device comprising:
a support beam with a circular tip;
a substantially planar housing comprising a circular edge, having a first side and a second side, the first side comprising a touch connect capable surface configured to connect to a portable electronic device and the second side is connected to the support beam, the device being configured to roll on an edge of the housing and on the tip of the support beam towards the portable electronic device when the device is near the portable electronic device;
an inductive charging component disposed between the first side and the second side.

2. The device of claim 1, further comprising a first magnet proximate to the first side, wherein the first magnet is configured to align with a second magnet associated with the portable electronic device.

3. The device of claim 1, further comprising a first magnet proximate to the first side, wherein the first magnet is configured to align to a metal component associated with the portable electronic device.

4. The device of claim 3, wherein the first magnet is within 4 mm of the first side.

5. The device of claim 1, wherein the inductive charging component is an inductive coil.

6. The device of claim 1, further comprising a first magnet in connection with the first side.

7. The device of claim 6, wherein the first magnet establishes the touch connect with the portable electronic device.

8. The device of claim 1, further comprising a metal component, configured to be attracted to a magnet, the metal component proximate to the first side.

9. The device of claim 6, wherein the location of the first magnet is adjustable.

10. The device of claim 9, wherein the location of the first magnet adjusts automatically when proximate to the portable electronic device.

11. The device of claim 1, configured to maintain the first side at an angle less than ninety degrees when placed on a flat surface.

12. The device of claim 1, wherein the inductive charging component is located closer to the first side than the second side.

13. The device of claim 1, wherein the second side is in connection with a power line.

14. The device of claim 1, wherein the largest device dimension is less than 18 cm.

15. The device of claim 1, wherein the distance between the first side and the second side is less than 9 mm.

16. The device of claim 1, wherein the first side is aligned opposite the second side, and the support beam extends from the second side in an orientation substantially perpendicular to the second side.

17. The device of claim 1, wherein the substantially planar housing is constructed having a size that is smaller than a surface of the portable electronic device to which the device is configured to connect.

* * * * *